United States Patent [19]

Hirata

[11] 4,292,113

[45] Sep. 29, 1981

[54] METHOD AND APPARATUS FOR MANUFACTURING CORRUGATED TUBES

[75] Inventor: Mituto Hirata, Kamakura, Japan

[73] Assignee: Toyo Kagaku Kabushiki Kaisha, Kanagawa, Japan

[21] Appl. No.: 157,702

[22] Filed: Jun. 9, 1980

Related U.S. Application Data

[63] Continuation of Ser. No. 20,393, Mar. 14, 1979, abandoned.

[30] Foreign Application Priority Data

Mar. 14, 1978 [JP] Japan .................................. 53-28326

[51] Int. Cl.³ .......................................... B65H 81/00
[52] U.S. Cl. .................................. 156/428; 156/195; 156/244.15; 156/498
[58] Field of Search ................ 156/195, 425, 428-432, 156/244.15, 143-144, 184, 189, 498

[56] References Cited

U.S. PATENT DOCUMENTS

| | | | |
|---|---|---|---|
| 3,173,822 | 3/1965 | Rigaut | 156/244.15 X |
| 3,477,891 | 11/1969 | Hawerkamp | 156/143 |
| 3,532,580 | 10/1970 | Kanao | 156/429 X |
| 4,043,856 | 8/1977 | Steward | 156/195 |

*Primary Examiner*—David A. Simmons
*Attorney, Agent, or Firm*—Jordan and Hamburg

[57] ABSTRACT

A method and apparatus for continuously forming a corrugated tube from a strip of synthetic resin in a softened state by the use of a plurality of rotating rollers arranged in a circular array such that said rollers define an imaginary cylinder about its central axis with the axes of said rollers being parallel to each other but angled relative to the central axis of the imaginary cylinder whereby as the rollers rotate the strip is helically wrapped around and advanced axially along said imaginary cylinder with portions of adjacent turns of the strip overlapping and joined together to form a continuous tube; characterized in that each of said rollers is provided with a plurality of axially spaced annular ridges therearound, said ridges of the respective rollers being so arranged that the associated successive ridges of each adjacent rollers are aligned in a spiral path around said imaginary cylinder.

6 Claims, 10 Drawing Figures

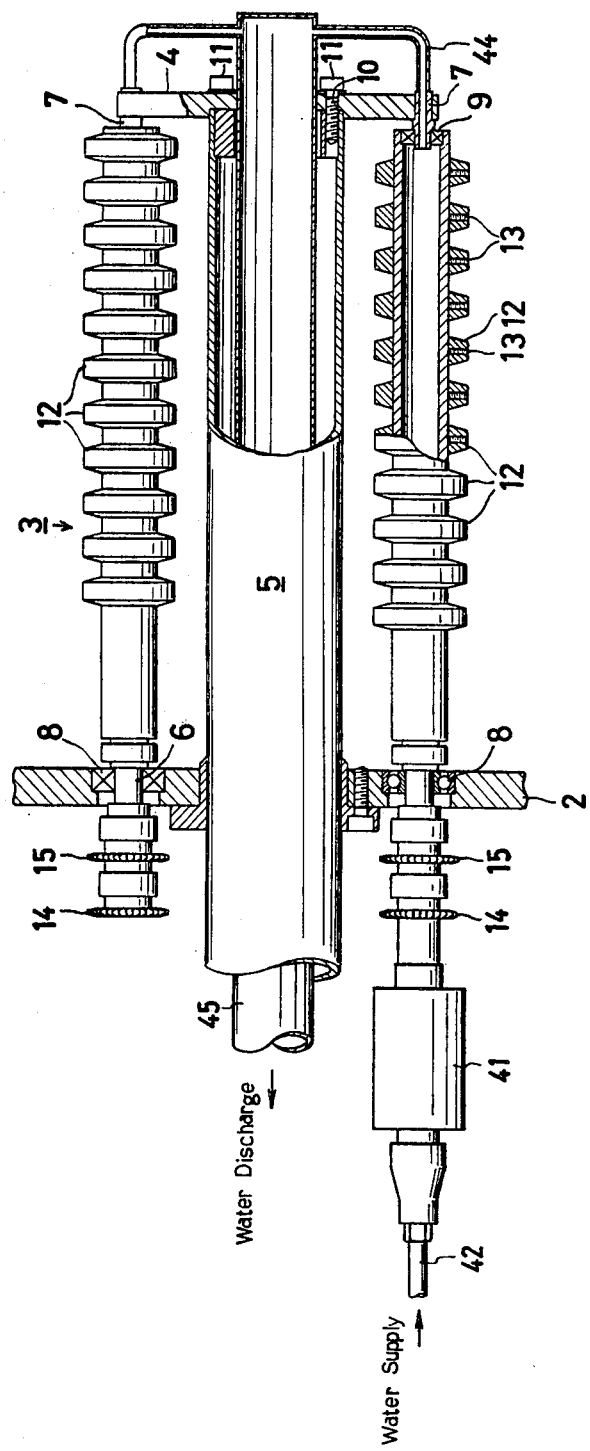

METHOD AND APPARATUS FOR MANUFACTURING CORRUGATED TUBES

This application is a continuation of Ser. No. 20,393 filed Mar. 14, 1979, now abandoned.

BACKGROUND OF THE INVENTION

1. Field of the Invention

This invention relates to a method and apparatus for producing a corrugated tube made of synthetic resin, and more particularly to a method and apparatus for manufacturing a corrugated tube the wall of which is corrugated in longitudinal cross-section to provide enhanced flexibility and a high pressure resistance.

2. Prior Art

Various types of flexible hose or tubes made of synthetic resin and method and apparatus for manufacturing the same have been heretofore proposed and some of them are currently in use.

One of the commonly practised prior art methods is to pass a softened synthetic resin tube into mold means having inner corrugated surfaces and then apply pressure to the interior of said tube so as to expand the tube wall against the inner corrugated surfaces of the mold means into the corresponding corrugated configuration to thus produce a flexible tube.

To carry out the foregoing operation on a continuous basis it has been proposed to provide said mold means in the form of a pair of two mold halves divided along a central longitudinal plane passing through the mold means, each mold half comprising a string of interconnected mold half sections in an endless loop. The two sets of mold half sections are adapted to run in their respective endless paths and are arranged such that at least one of the mold half sections of one set is mated with at least one of the mold half sections of the other set. Pressure is applied to the interior of a softened synthetic resin tube as the latter is continuously fed into the mold defined by said mated mold half sections to press the tube wall against the inner corrugated wall of the mold half sections to thus produce a corrugated tube in a continuous manner.

However, this prior art method requires extremely large and complicated equipment, resulting in an increase in the manufacturing cost of the product.

Another form of the prior art process of producing a flexible tube of synthetic resin is to employ a plurality of smooth surfaced roller mandrels rotatable about their own axes and arranged parallel to each other with the axes of the roller mandrels arrayed in a circle so that the mandrels cooperate to define an imaginary cylinder. As a strip of synthetic resin material is continuously fed in a softened state onto said rolled mandrels rotating at an equal speed, it is helically wrapped around the imaginary cylinder defined by said mandrels with portions of adjacent turns of the strip overlapping one on another and joined together to produce a continuous tube. This method involves a reasonable manufacturing cost as compared with the first mentioned method. However, the flexible tube produced according to this type of prior art method required a reinforcing core wire such as metal wire which may be embedded in the overlapping portions of the strip as it is spirally wrapped around, in order to impart required flexibility and resistance to exterior pressure. Alternatively, it was necessary to have a portion of the strip thickened with relatively thinned portions joined together in overlapping relation whereby said thickened portion provides adequate strength to withstand exterior pressure.

However, the tube having a core wire embedded in its wall not only required complicated manufacturing procedures but also had the disadvantage that a uniform resistance to exterior pressure was not necessarily ensured throughout the tube wall due to differentials in strength between the core wire-embedded portions and the remaining portions. The tube reinforced with preformed thickened portions also required an additional step of providing such preformed strip of synthetic resin, and it again had the disadvantage that the alternating thickened and thinned portions caused unevenness in thickness resulting in nonuniform strength.

OBJECTS AND SUMMARY OF THE INVENTION

Accordingly, an object of the present invention is to overcome the foregoing drawbacks to the prior art.

A specific object of the invention is to provide a method and a relatively compact and simple apparatus for continuously producing a corrugated tube having a corrugated wall configuration in longitudinal cross-section.

Another object of the invention is to provide a method and apparatus for manufacturing a tube corrugated in longitudinal cross-section which has a uniform wall thickness throughout the tube and sufficient flexibility and pressure resistance.

Still another object of the invention is to provide a method and apparatus for manufacturing a tube corrugated in longitudinal cross-section having a uniform resistance to pressure throughout the tube.

A further object of the invention is to provide a method and apparatus for manufacturing a tube corrugated in longitudinal cross section which is provided with an adequate pressure resistance without the need for using any reinforcement means such as reinforcing wires, thickened portions or the like.

A still further object of the invention is to provide a method and apparatus for readily producing a corrugated tube having a desired wall thickness from a strip of synthetic resin having a predetermined thickness.

Still another object of the invention is to provide a method and apparatus for manufacturing a corrugated tube efficiently while cooling the tube.

The obove and other objects of the invention will become apparent from the following description when taken in conjunction with the accompanying drawings.

Briefly, the present invention provides a method of manufacturing a corrugated tube having axially excending spiral convolutions to define a corrugated wall configuration in longitudinal cross-section comprising the steps of arranging in a circular array a plurality of rollers each rotating at the same speed such that an imaginary cylinder is defined about a central axis by said rollers, the longitudinal axes of said rollers being parallel to each other but offset with respect to the central axis of the imaginary cylinder, and continuously feeding a strip of synthetic resin material in a softened state generally perpendicularly to the length of said rollers in such a manner that said strip is helically wrapped around and advanced axially along said imaginary cylinder defined by the rollers with portions of adjacent turns of the strip overlapping one on another and welded together to form a continuous tube; characterized in that each of said rollers is provided with a plurality of axially spaced annular ridges around the outer periphery thereof, said ridges of the respective rollers being so arranged that the associated successive ridges of each adjacent roller are aligned in a spiral path around said imaginary cylinder, said strip of synthetic resin material being fed onto the imaginary cylinder while being pressed onto at least one of the rollers so that said convolutions are formed on the strip by the ridges, while the first turn of the strip being wrapped around said imaginary cylinder is overlapped for at least half the width thereof by the next succeeding turn of the strip, the trailing side edge of the first turn of the strip around said imaginary cylinder mating with the leading side edge of no earlier than the third turn of the strip.

The invention also provides an apparatus for manufacturing a corrugated tube having axially extending spiral convolutions to form a corrugated wall configuration in longitudinal cross-section comprising a roller assembly composed of a plurality of rollers arranged in a circular array so as to define an imaginary cylinder about a central axis with the longitudinal axes of said roller offset with respect to the central axis of the imaginary cylinder while the rollers are maintained in parallel to each other; means for continuously feeding a strip of synthetic resin material in a softened state transversely onto the periphery of said roller assembly; and drive means for rotating each of said rollers at the same speed; characterized in that each of said rollers is provided with a plurality of axially equally spaced annular ridges therearound, the ridges of the respective rollers being arranged such that the associated ridges of each adjacent roller are successively aligned with each other along a spiral path; each of said rollers being provided with cooling means for introducing cooling medium thereinto and discharge means for discharging the cooling medium therefrom; and that pressure roller means is provided having annular ridges therearound adapted to mate with recesses defined by each adjacent ridge of at least one of said rollers whereby said strip is spirally wrapped around the roller assembly while being axially advanced as the strip is fed onto the periphery of the roller assembly and the strip is formed with corrugations along said ridges as it is wrapped around.

BRIEF DESCRIPTION OF THE DRAWINGS

FIG. 4b is an enlarged, partly broken away view similar to FIG. 4a in which an alternate form of the cooling means different from that of FIGS. 1 to 3 is shown but the cooling and regulating means is not shown for simplicity;

PREFERRED EMBODIMENT OF THE INVENTION

Figure 1:
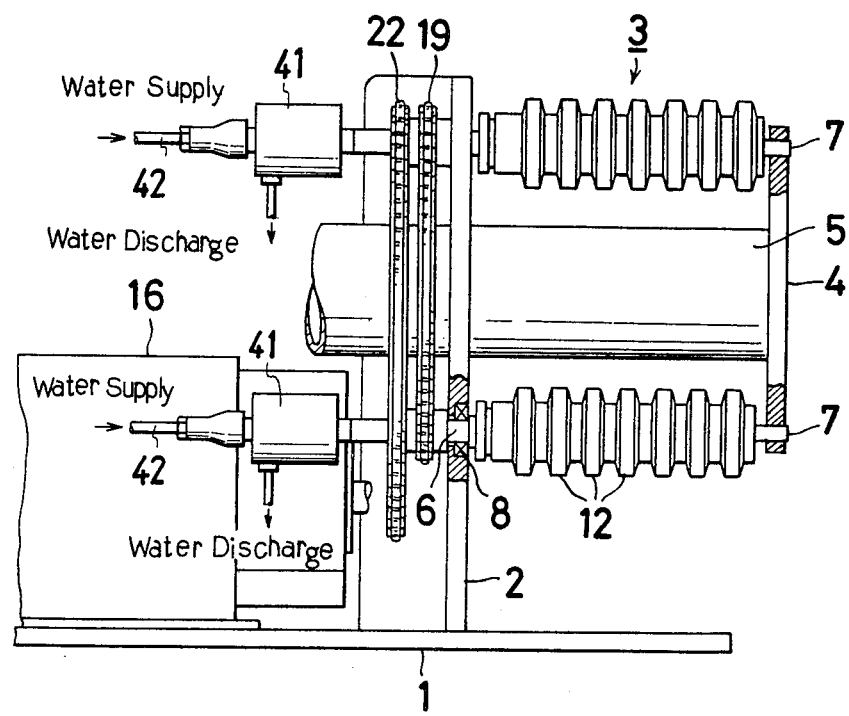
FIG. 1 is a side elevation of an embodiment of apparatus according to the invention for manufacturing a corrugated tube illustrating only two rollers for the benefit of clarity.

Referring to the drawings, an apparatus according to the invention for manufacturing a corrugated tube includes a base 1, an upright support frame 2 mounted on the base and a rotating roller assembly 3. A strip (A) of synthetic resin material is extruded from a die 24 as shown in FIG. 2 and fed onto and wrapped around the roller assembly 3 to be formed into a tube while the strip defining the tube wall is formed with corrugations in cross-section by the roller assembly.

Figure 2:
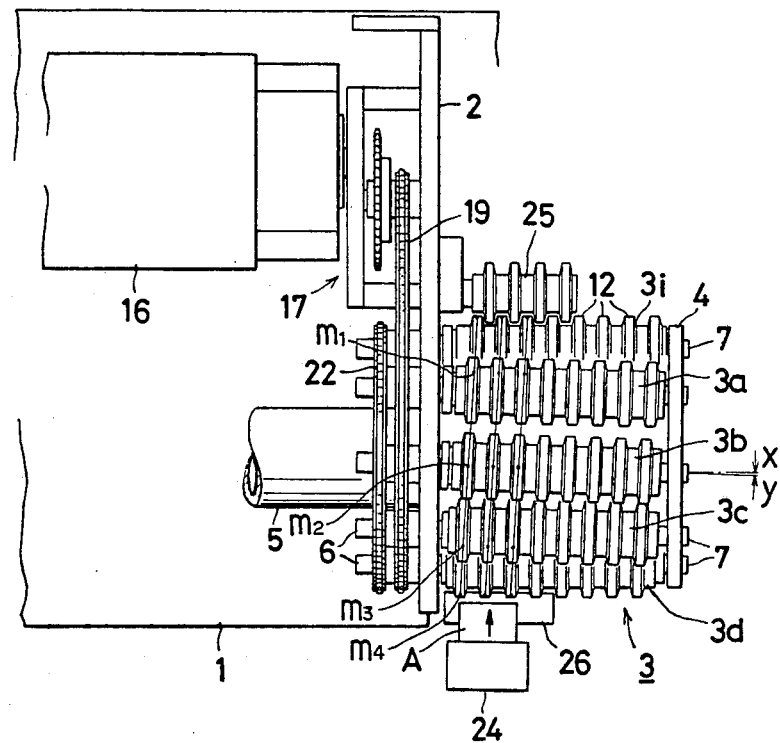
FIG. 2 is a top plan view of the apparatus shown in FIG. 1 with the rotary joints associated with the respective rollers being removed from the drawing for the purpose of illustration.
Figure 3:
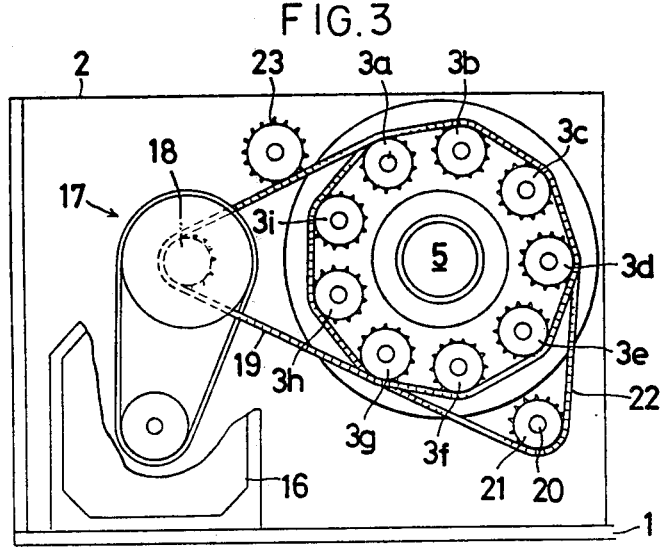
FIG. 3 is a rear view of the apparatus shown in FIGS. 1 and 2.

The roller assembly 3 comprises a circular array of nine rollers 3a, 3b, 3c . . . 3i extending between and rotatably carried by the support frame 2 and the opposed support disc 4 in the embodiment shown in FIGS. 1-3.

Figure 4A:
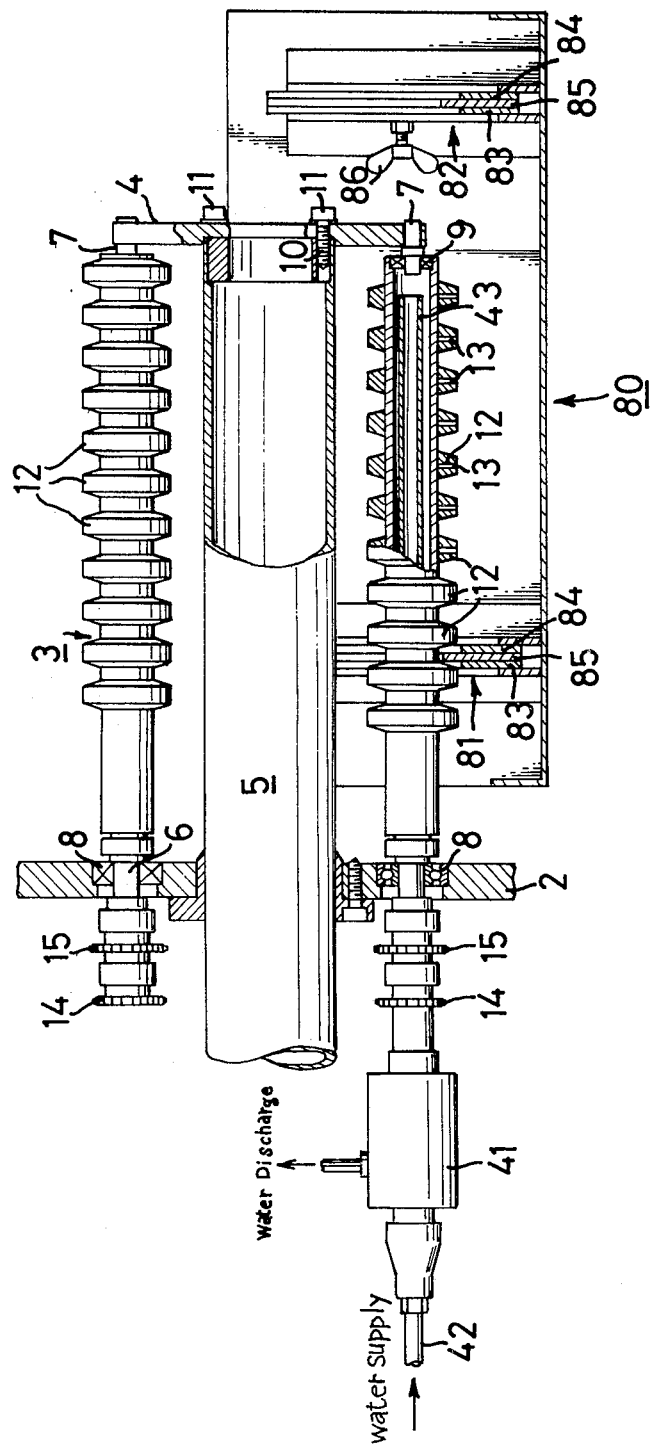
FIG. 4a is an enlarged, partly broken away view showing the details of the rollers of the apparatus shown in FIGS. 1 and 2 wherein only two of the rollers are shown for simplicity and the cooling means associated with only one of the rollers is illustrated.
Figure 5:
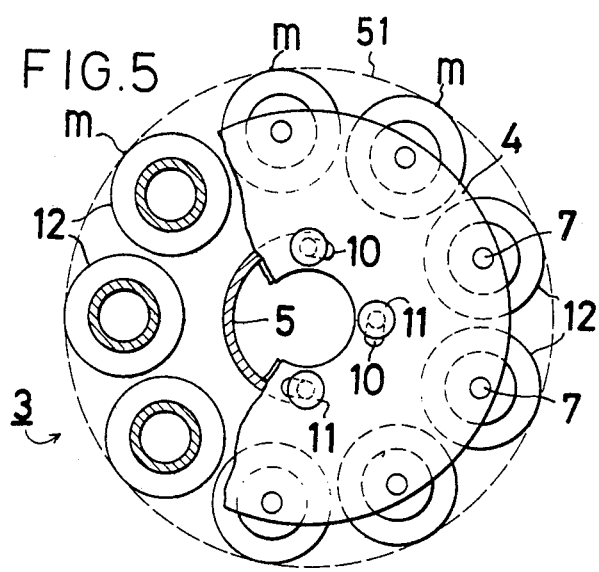
FIG. 5 is a front view of the apparatus shown in FIGS. 1 to 3 illustrating the arrangement of the rollers in a schematic form for the benefit of understanding.

Disposed centrally within the array of rollers is a hollow base shaft 5 extending through the support frame 2. The support disc 4 is secured to the base shaft 5 adjacent its outer end. The rollers 3a, 3b, 3c . . . 3i extend between the opposed surfaces of the support frame 2 and support disc 4 and are equally spaced apart and arranged parallel to each other around an imaginary cylinder about the base shaft 5. Each of the rollers is rotatably mounted at its opposite ends by means of stud shafts 6 and 7 which are received in bearings 8 and 9, respectively (FIGS. 4a and 4b). As shown in FIGS. 4a, 4b and 5, the support disc 4 secured to the outer end of the base shaft 5 is formed with a plurality of elongated slots 10 extending therethrough and arranged in a circular array confronting with the end of the base shaft. Each of the slots 10 is elongated for a predetermined length in the circumferential direction of the base shaft. The support disc 4 is secured to the end of the base shaft by bolts 11 passed through the slots 10 in the disc and threaded into the shaft end. With this arrangement, the disc 4 may be rotated about the axis of the base shaft to the limit determined by the elongated slots 10 whereby the longitudinal axes of the rollers 3a, 3b, . . . 3i may be angled or offset with respect to the central longitudinal axis of the base shaft while the rollers are maintained in parallel with each other. FIG. 2 illustrates the rollers 3a, 3b . . . 3i arranged with their axes offset with respect to the base shaft 5. Taking the roller 3b by example, it will be noted that the axis y of the roller 3b is angled with respect to a line x parallel to the axis of the base shaft 5. The bearings 8, 9 for the rollers are adapted to accommodate such angular arrangement of the rollers. Such bearings per se are known and need not be described herein in details.

As best seen in FIGS. 4a and 4b, the rollers 3a, 3b . . . 3i are each provided with a plurality of annular ridges 12 surrounding their peripheries and spaced apart with a predetermined pitch along substantially the full length of the rollers, thus presenting the configuration similar to a grooved roller. In the embodiment illustrated the ridges 12 are formed by a plurality of spaced apart rings fitted around a smooth surfaced cylindrical roller mandrel. The ridges or rings 12 have a trapezoidal cross section and are inserted over the roller mandrel successively from one end thereof and secured to the mandrel with a predetermined pitch by means of set screws 13 passed radially through the rings with the top ends of the screws recessed from the outer peripheral surfaces of the rings. The rings 12 are arranged with the same spacings on all the rollers but the pitch of the rings on each roller may be varied by the use of set screws 13.

As shown in FIGS. 4a and 4b, sprockets 14 and 15 are mounted on the stud shafts 6 of the rollers 3a, 3b . . . 3i extending through the support frame 2. The sprockets 14 are secured to the shafts 6 of the seven rollers 3a to 3g while the sprockets 15 are secured to the shafts 6 of the seven rollers 3g to 3d as seen from FIG. 3. As also shown in FIG. 3 an endless chain 19 is passed around the sprockets 14 and a sprocket 18 which is secured to the output shaft of a reducer 17 which is in turn connected to a motor 16. A second endless chain 22 is trained around the sprockets 15 and an idler sprocket 21 which is loosely mounted to a shaft 20 staked to the support frame 2. With this arrangement the operation of the motor 16 causes rotation of the sprocket 18 via the reducer 17 to thereby move the chain 19 which in turn rotates the sprocket 14 and their associated rollers 3a and 3g. The rotation of the rollers 3a and 3g causes rotation of the sprockets 15 secured to the shafts 6 of the rollers 3a to 3d and 3g and movement of the endless chain 22 engaged with those sprockets 15. The rotation of the chain 22 in turn rotates the remaining rollers 3h and 3i. Thus, the motor 16 is operable to rotate all of the nine rollers constituting the roller assembly 3 by means of the chains 19, 22 in the direction of rotation of the chain 19. The drive mechanism further includes a tension adjusting sprocket 23 for adjusting the tension of the chain 19.

As indicated hereinbefore, when the rollers 3a, 3b . . . 3i are angled with respect to the base shaft 5 by turning the disc 4, an imaginary line connecting successive adjacent contact points m1, m2, m3 . . . (FIGS. 2 and 5) between the ridges or rings 12 on the adjacent rollers and the periphery of the imaginary cylinder 51 defined by the rotating roller assembly 3 describes a spiral axially advancing around the imaginary cylinder. Accordingly, considering the roller assembly as a whole, the ridges 12 may be considered as if they were spirally extending around the periphery of the roller assembly. As stated hereinbefore, the pitch of such "spiral" ridges may be varied by changing the spacing between the rings 12 on the rollers 3 whereby the corrugated configuration to be formed on the strip may be varied.

Referring to FIG. 2, an extruder head 24 is mounted at one side of the roller assembly 3 adjacent the support frame 2 to feed a strip (A) of synthetic resin transversely onto the roller assembly. Positioned parallel to the roller assembly downstream of the extruder head is a pressure roller 25 having complementary ridges for meshing engagement with the ridges of the roller assembly and adapted to press the softened strip (A) as it is extruded through the extruder head against the periphery of the roller assembly. As the strip (A) in the form of tape or web is extruded through the extruder head, it is guided by a guide roller 26 onto the periphery of the roller assembly whereupon due to the angular disposition of the rollers 3a, 3b . . . 3i relative to the base shaft 5 as described before the synthetic resin strip is axially advanced in a spiral path along the ridges 12 and wrapped around the periphery of the roller assembly as the rollers 3 rotate. More specifically, in the illustrated embodiment the strip (A) is first fed onto the roller 3c and then wrapped around the rotating roller assembly as it is passed successively along the rollers 3b, 3a, 3i, 3h . . . . The synthetic resin strip is wrapped around in its flat state while it is passed around the first three rollers 3a, 3b and 3c until it reaches the roller 3i. As the strip passes around the roller 3i it is passed against said roller by the opposed pressure roller 25 to be formed in conformity with the corrugations on the rollers and continues to be spirally wrapped around while it remains in its corrugated configuration.

Figure 6:
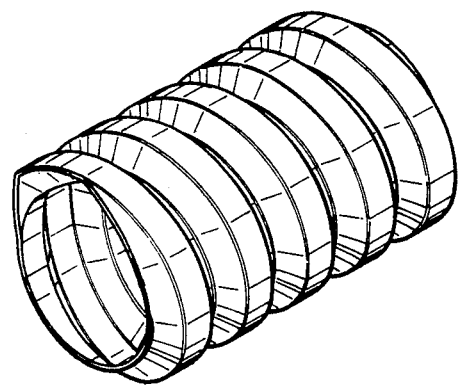
FIG. 6 is a perspective view of a corrugated tube produced according to the present invention.

The synthetic resin strip is thus spirally wound around to form a tube as it completes one turn around the roller assembly 3 and then the succeeding turn of the strip overlaps partially the first spiral turn. The flat strip (A) is thus continuously wrapped around and fed forward of the roller assembly as a corrugated tube having spiral corrugations therearound. According to the present invention, the width of the strip is such that the first spiral turn of the strip wrapped around the rotating roller assembly 3 is overlapped by no less than half the width of the next succeeding turn of the strip. The overlapping portions are pressed by the pressure roller 25 against the roller assembly to be formed into spirally corrugated shape along the ridges while the overlapping portions in their softened state are pressed and joined together to produce a corrugated tube as shown in FIG. 6.

Referring to FIG. 4a, each of the rollers has a rotary joint 41 connected to its inner end which joint is in turn connected with a water supply conduit 42. Cooling water may be introduced through the conduit 42 and rotary joint 41 into an inner conduit 43 disposed within the roller. The cooling water is then passed through an annular space defined between the wall of the inner conduit 43 and the inner wall of the roller back into the rotary joint 41 and discharged therethrough.

FIG. 4b illustrates another form of cooling system wherein the cooling water introduced into the hollow roller is discharged through a pipe 44 and hence through a discharge conduit 45 disposed within the base shaft 5. In this manner the roller surface is cooled whereby the hot strip of synthetic resin may be fed at a high rate to increase the productivity.

The present invention will be further described with reference to one example. Synthetic resin materials suitable for use with the invention include thermoplastics such as polyethylene, polypropylene, polyvinyl chloride and the like.

In this example the roller assembly 3 comprising a plurality of rollers had an inner diameter of 145 mm and an outer diameter of 165 mm. Each of the rollers was provided therearound with a plurality of ridges or rings 12 spaced apart with spacings of 8 mm, each ring being of a trapezoidal shape in cross-section having a top width of 8 mm and a height of 8.5 mm.

Figure 7A:
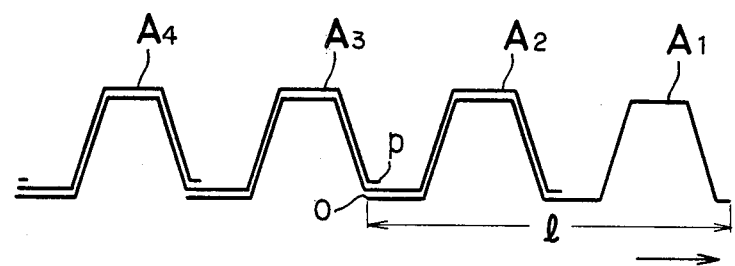
FIGS. 7a and 7b are diagramatical views showing the overlapping relation of the successive turns of the synthetic resin strip defining the wall of the corrugated tube as manufactured according to the invention.

In operation, medium low-pressure polyethylene melted at a temperature in the range of 200° to 250° C. was extruded through the die head 24 as a flat strip 66 mm wide and 1.25 mm thick as shown in FIG. 2 and fed via the guide roller onto the rotating roller assembly 3. The polyethylene strip moved along the rollers 3c, 3b and 3a successively and reached the roller 3i where it was formed with corrugations by the cooperating pressure roller 25 and roller 3i, and then moved along the rollers 3h, 3g, 3f, 3e and 3d to complete one turn. FIG. 7a illustrates the overlapping relation between the successive turns of the polyethylene strip. A₁ is a corrugated cross section of the strip when it has completed its first turn around the roller assembly. The strip $A_2$ continues to be fed into partial overlapping engagement with the strip $A_1$, and upon completion of the second turn the strip $A_2$ overlaps half the width l of the first turn of strip $A_1$ to double the wall thickness. Likewise, the third and fourth turns $A_3$ and $A_4$ of the strip are continuously fed while the spirally wound strip advances along the rollers in a direction indicated by the arrow and leaves the forward end of the roller assembly as a finished corrugated tube. It is to be understood that the trailing side edge O of the strip $A_1$ mates with the leading side edge P of the strip $A_3$ with the strip $A_2$ held therebetween, so that a corrugated tube having a uniform thickness throughout may be obtained.

It was found that the thus formed corrugated tube had a pressure resistance of 127 kg. The measurement was made by placing a pressure element having a diameter of 100 mm on a sample tube cut to a length of 150 cm and pressing on the pressure element until the tube was deformed by 20%, and the pressure applied to the pressure element was expressed as the pressure resistance of the tube.

Figure 7B:
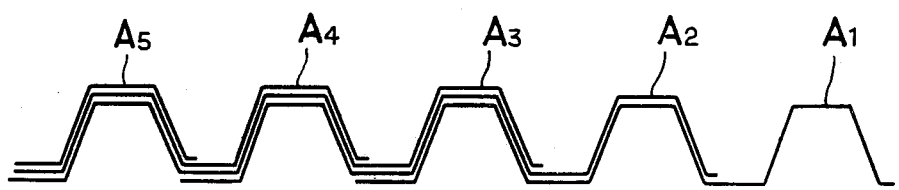

FIG. 7b illustrates the overlapping relation between the successive turns of a wider strip (80 mm wide and 1.0 mm thick). It will be readily understood from the drawing that the wider strip produces a corrugated tube having a wall three times as thick (3.0 mm) as the thickness of the strip.

Figure 8:
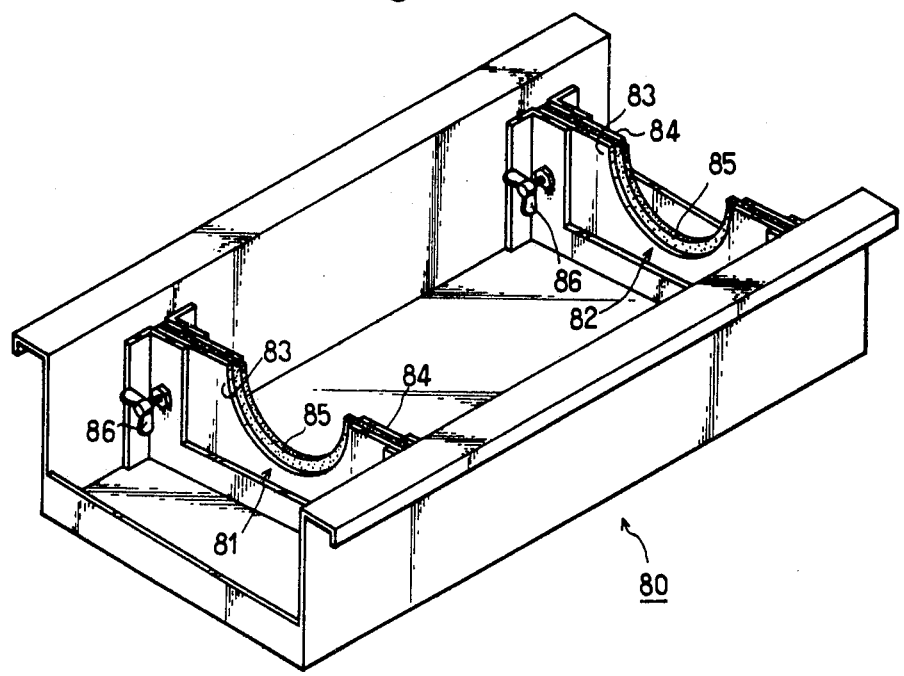
FIG. 8 is a perspective view showing the cooling and regulating means according to the invention.

Referring to FIG. 8, a trough 80 is generally shown. The trough has two partition plates 81, 82. In the enclosure defined by the trough 80 and the partition plates 81, 82, water is stored for cooling the corrugated tube produced according to the invention. Each partition plate is composed of two side plate members 83, 84 and a central plate member 85 sandwitched therebetween the movable up and down. The central plate member 85 should be made of materials having proper hardness so that when contacted with the spiral convolutions formed on the corrugated tube wall, the plate member 85 regulates and finish the form of the spiral convolutions while preventing leakage of water in the trough 80. As shown in FIG. 4a, the partition plate 81 is adapted to the roller assembly 3, whereas the plate 82 is out of the assembly 3. At the startup, the central plate member is placed at its lowermost position. When the strip is wrapped around the assembly 3 and the leading edge of the corrugated tube arrives at the partition plate 82, the central plate member 85 is moved upwards to contact and properly fit the spiral convolutions on the tube and fastened by screws 86. Of course, the partition plate 81 should be placed at the position were predetermined tube wall thickness is made of the strip and where the tube wall has not yet solidified. When the trough is adapted, manufacturing speed is greatly enhanced. Further, good finished products are obtained.

From the foregoing descriptions it is to be appreciated that according to this invention, a corrugated tube having a uniform wall thickness a number of times the thickness of the strip may be obtained by varying the width and overlapping proportions of successive turns of the synthetic resin to be fed to the roller assembly. Of course, the corrugated tube formed according to the present invention provides a desired flexibility due to the corrugated wall configuration and may be advantageously used as a closed drainage pipe for agriculture or earth works, a conduit for electric conductors, and the like.

Furthermore, according to the present invention, corrugated tubes having different shapes of corrugation may be produced inasmuch as the rings on the rollers constituting a roller assembly may be replaced by rings of different configurations and the distances between the rings may also be varied.

While the present invention has been described with reference to the preferred embodiments, it is to be understood that various changes and modifications may be made without departing from the spirit and scope of the invention.

What is claimed is:

1. Apparatus for manufacturing a corrugated tube having axially extending spiral convolutions to form a corrugated wall configuration in longitudinal cross-section comprising:

a roller assembly composed of a plurality of rollers arranged in a circular array so as to define an imaginary cylinder about its central axis with the longitudinal axes of said rollers offset with respect to the central axis of the imaginary cylinder while the rollers are maintained in parallel to each other, each of said rollers comprising a roll mandrel and a plurality of rings fitted around the mandrel, said rings defining a plurality of axially equally spaced annular ridges around each of said rollers, the ridges of the respective rollers being arranged such that the associated ridges of each adjacent roller are successively aligned with each other along a spiral path, said rings being adjustably fastened to the mandrel by screws so as to permit adjustment of the pitch of the rings along the mandrel as required;

means for continuously feeding a flat strip of synthetic resin material in a softened state transversely onto the periphery of said roller assembly;

drive means for rotating each of said rollers at the same speed;

cooling means for introducing cooling medium into each of said rollers and discharge means for discharging the cooling medium therefrom; and pressure roller means having annular ridges therearound adapted to mate with recesses defined by each adjacent ridge of at least one of said rollers whereby said strip is spirally wrapped around the roller assembly while being axially advanced as the strip is fed onto the periphery of the roller assembly and the strip is formed with corrugations along said ridges as it is wrapped around.

2. Apparatus for manufacturing a corrugated tube having axially extending spiral convolutions to form a corrugated wall configuration in longitudinal cross-section comprising:

a roller assembly composed of a plurality of rollers arranged in a circular array so as to define an imaginary cylinder about its central axis with the longitudinal axes of said rollers offset with respect to the central axis of the imaginary cylinder while the rollers are maintained in parallel to each other, each of said rollers being provided with a plurality of axially equally spaced annular ridges therearound, the ridges of the respective rollers being arranged such that the associated ridges of each adjacent roller are successively aligned with each other along a spiral path;

means for continuously feeding a flat strip of synthetic resin material in a softened state transversely onto the peripheral of said roller assembly;

drive means for rotating each of said rollers at the same speed;

cooling means for introducing cooling medium into each of said rollers and discharge means for discharging the cooling medium therefrom, each said cooling means comprising a supply conduit, the associated one of said rollers, and a rotary joint connected at one end to said supply conduit and at the other end to one end of said associated roller whereby cooling medium is introduced through the conduit and the rotary joint into the roller; and pressure roller means having annular ridges therearound adapted to mate with recesses defined by each adjacent ridge of at least one of said rollers whereby said strip is spirally wrapped around the roller assembly while being axially advanced as the strip is fed onto the periphery of the roller assembly and the strip is formed with corrugations along said ridges as it is wrapped around.

3. Apparatus according to claim 2 wherein said each discharge means comprises an inner pipe disposed in said associated roller and said rotary joint communicated with said inner pipe whereby said cooling medium passed through said inner pipe is returned through an annular space defined by the inner pipe and the roller and discharged through the rotary joint.

4. Apparatus according to claim 2 wherein said each discharge means comprises a conduit connected at one end to the other end of the associated roller and an outlet header conduit disposed centrally within said roller assembly and connected with the other end of the respective rollers.

5. Apparatus according to claim 1 or 2 further comprising means for cooling the strip spirally wrapped around the roller assembly from exterior and at the same time regulating the form of said spiral convolutions on the corrugated tube wall, said means being adapted to said roller assembly.

6. Apparatus according to claim 5 wherein said cooling and regulating means comprises a trough provided with partition plates for storing cooling medium therein, each of said partition plates being adaptable to said spiral convolutions formed on the corrugated tube wall, at least one of said plates being adapted to the roller assembly to thereby regulate the form of the spiral convolutions.

* * * * *